United States Patent [19]
Busuttil

[11] Patent Number: 5,665,255
[45] Date of Patent: Sep. 9, 1997

[54] LASER WELDING APPARATUS AND METHOD FOR HIGH TEMPERATURE GRADIENT COOLING ALLOYS

[75] Inventor: Peter L. Busuttil, Troy, Mich.

[73] Assignee: Progressive Tool & Industries Company, Southfield, Mich.

[21] Appl. No.: 509,903

[22] Filed: Aug. 1, 1995

[51] Int. Cl.⁶ ................................................ B23K 26/08
[52] U.S. Cl. ........................ 219/121.63; 219/121.64
[58] Field of Search ........................ 219/121.63, 121.64, 219/121.78, 121.79, 121.8, 121.61; 148/525

[56] References Cited

U.S. PATENT DOCUMENTS

| | | | |
|---|---|---|---|
| 4,665,294 | 5/1987 | Hira et al. | 219/121.64 |
| 4,746,540 | 5/1988 | Kawasaki et al. | 219/121.64 |
| 4,760,240 | 7/1988 | Iikawa et al. | 219/121.64 |

FOREIGN PATENT DOCUMENTS

| | | | |
|---|---|---|---|
| 594210 | 4/1994 | European Pat. Off. | 219/121.64 |
| 291717 | 7/1991 | Germany | 219/121.78 |
| 54-101596 | 8/1979 | Japan | 219/121.61 |
| 63-177992 | 7/1988 | Japan | 219/121.64 |
| 3-285785 | 12/1991 | Japan | 219/121.78 |

*Primary Examiner*—Geoffrey S. Evans
*Attorney, Agent, or Firm*—Young & Basile, P.C.

[57] ABSTRACT

Metal alloy workpieces are laser welded to one another with a laser head emitting a laser beam. The laser head and workpieces are moved relative to one another at a predetermined velocity along a weld path. The laser beam power is selectively modulated to have an output with a desired frequency and/or amplitude. An oscillating motion of the laser beam is superimposed on top of the relative velocity of movement between the laser head and the workpieces along the weld path, such that a rate of cooling of molten metal is controlled to a predetermined rate. A stroke rate of the oscillating motion is synchronized with the frequency of the modulated power output so that as the laser head moves along the weld path at a constant velocity, the laser beam is oscillated to thereby cause the laser beam to at least slow down relative to the velocity of travel between the laser head and the workpieces along the weld path during backward oscillatory movement of the laser beam.

19 Claims, 2 Drawing Sheets

LASER WELDING APPARATUS AND METHOD FOR HIGH TEMPERATURE GRADIENT COOLING ALLOYS

FIELD OF THE INVENTION

The invention relates to an apparatus and method for laser welding high temperature gradient cooling alloys, and in particular a laser welding head capable of emitting a modulated output power laser beam movable along a predetermined weld path while oscillating the beam at a selected frequency and amplitude along a path coaxial with the weld path preferably synchronized with the modulated output power for connecting high temperature gradient cooling alloys, such as aluminum based alloys.

BACKGROUND OF THE INVENTION

It is commonly known that certain metal alloy materials are difficult to connect to one another by welding. In particular, laser welding of certain materials are known to exhibit hot cracking, micro-cracking, and/or embrittlement along the weld joint. This cracking typically has a tendency to move along the center of the weld nugget and is evident not only in regular laser welding, but also in the other traditional welding processes, such as gas metal arc and gas tungsten arc, when filler metals are not used. These processes all use a high energy heat source to melt the metal and form a molten metal pool. The point of resolidification is just after the weld pool. The middle of the weld joint is typically subjected to severe thermal gradients. The heat is quickly conducted to the colder regions of the material being welded. These severe thermal gradients cause a fast quench in the material being welded, which in turn causes minute fissures, or cracks, to form along with elements such as silicon in the case of 6000 series aluminum alloys. Silicon or carbon are part of the metallurgical compositions of certain aluminum or steel alloys. The carbon or silicon emerge in their elemental form during welding and further weaken the weld.

A process has previously been proposed for laser welding a cover and a casing each made of an aluminum or an aluminum-based alloy, via a nickel layer plated thereon, thereby forming a package for electronic devices. The process includes boring apertures in the sides of the casing through which input and output terminals can be inserted and soldered hermetically to the casing, plating a nickel layer on the surface of the casing, mounting electronic devices in the casing and forming necessary connections between the devices and the terminals, welding the cover and the casing together by pulse YAG laser irradiation to form a weld zone containing 1.5 to 10.0% of nickel by weight and sealing the cover and the case hermetically.

Another method has been proposed of welding together aluminum alloy workpieces of the same aluminum alloy. This method includes the steps of disposing a selected alloying metal on the workpiece in the desired weld areas, locally heating the workpieces in the welding area to form a localized liquid solution, and solidifying the localized liquid solution to form the weld between the like aluminum alloy workpieces. The selected alloying metal is silicon for aluminum alloys of interest, and a laser is the preferred heating means for effecting the welding.

A method for forming an alloy layer on an aluminum alloy substrate by irradiating with a $CO_2$ laser has also been proposed. In this method, a powder for alloying, containing a substance to be alloyed with the substrate and an element selected from the group consisting of silicon and bismuth, is disposed on the surface of the aluminum alloy substrate. The powder is then irradiated with a $CO_2$ laser, so as to be melted and fused together with a surface portion of the aluminum alloy substrate, so that these two are alloyed together.

SUMMARY OF THE INVENTION

It is desirable in the apparatus and method according to the present invention to counteract the fast quenching of the laser welding zone. It is believed that by reducing the severe thermal gradients caused by a fast quench, that it may be possible to prevent the silicon or carbon from emerging in their elemental form during welding, and to reduce the minute fissures or cracks that form along the weld joint. According to the present invention, a laser head and workpieces are moved relative to one another at a predetermined velocity along a weld path to weld the workpieces to one another while the laser head emits a laser beam. Means are provided according to the present invention for superimposing an oscillating motion to the laser beam over the relative velocity of movement between the laser head and the workpieces along the weld path, such that a rate of cooling of molten metal formed by the laser beam along the weld path is controlled to a predetermined cooling rate. Preferably, the present invention presents the laser beam in a linear sweeping motion along the weld path which is synchronized to the modulated output of a high average power laser. The laser beam is controlled to synchronize the oscillating motion to the power output frequency of the laser beam. This frequency synchronization can be in one-half, full, or multiple pitch, or frequency. Halving or doubling the frequency will yield different desired effects on the material. Different materials, joint designs, material thickness, require different settings and parameters.

When the frequency is matched, that is having a ratio of 1:1, the laser beam can be swept forward relative to the direction of travel along the weld path while the laser power is on an upswing along the power curve. Meanwhile, the laser head mounted to the motion device, such as a robot arm, can be moving in the same overall direction. On the downside of the power curve, the laser beam will be swept backwards relative to the weld direction and cause a stall, slowdown, or even a backward motion dependent on the overall relative speed between the laser head and workpieces to be joined. If the sweep speed of the focused laser beam is the same as that of the overall laser head, a stall condition will occur. If the sweep speed of the focused laser beam is faster than the overall laser head, a backward motion will occur. Conversely, if the focused laser beam sweep speed is slower than the overall laser head speed, a slowdown will occur. Adjusting the sweep distance of the laser beam will also derive a similar effect. In all cases, the intent of the present invention is to cause a pause or a reduction in the overall weld speed while lowering the laser power level to reduce the temperature gradient at the weld zone. It is believed that this regulated cooling of the weld zone will make is possible to reduce or eliminate the hot cracking and the formation of elements in their elemental form indicative to the welding of certain alloys.

The present invention provides an apparatus to laser weld hard to weld alloys, such as aluminum alloys. The apparatus is traversed over workpieces by a robot, or other motion device, and is believed to overcome the metallurgical problems encountered in traditional welding and laser welding. The welding head is directly coupled both optically and electrically to a laser. The apparatus operates in conjunction with a robot, or motion device, and the modulated output of a laser, such as a neodymium-yag (Nd:Yag) laser to prevent the hot cracking which is typical to aluminum welding. The laser head incorporates a laser beam delivery system attached to a focusing assembly which is mounted to the laser weld head. The focusing assembly, or the whole optical head can be allowed to swivel in one axis and is powered by a servo-motor, or electrical solenoid, through a linkage. The laser weld head is in turn mounted to and conveyed by a robot, or programmable motion device.

The apparatus according to the present invention is used for laser welding a plurality of metal alloy workpieces to one another with a laser head emitting a laser beam. The laser head and the workpieces move relative to one another at a predetermined velocity along a weld path. Means for modulating the power of the laser beam to a selected modulated power output having a frequency is provided. Means for superimposing an oscillating motion of the laser beam over the relative velocity of movement of the laser head along the weld path is also provided, such that a rate of cooling of molten metal formed by the laser beam along the weld path is controlled to a predetermined cooling rate. The present invention also provides means for synchronizing a stroke rate of the oscillating motion with the frequency of the modulating means.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED AND ALTERNATIVE EMBODIMENTS

Figure 1:
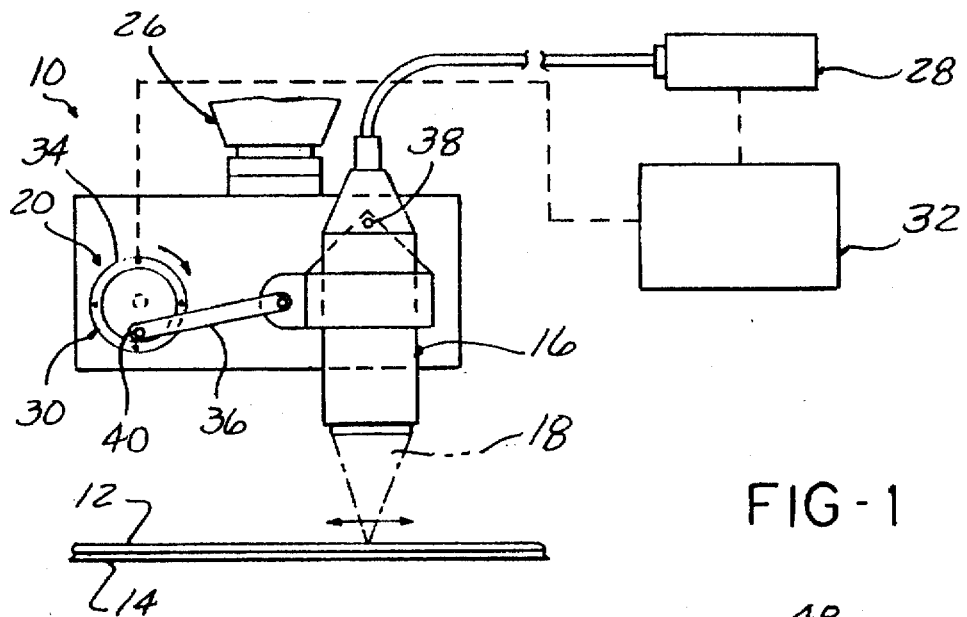
FIG. 1 is a side elevational view of an apparatus for laser welding a plurality of metal alloy workpieces to one another with a laser head emitting a laser beam according to the present invention.
Figure 2:
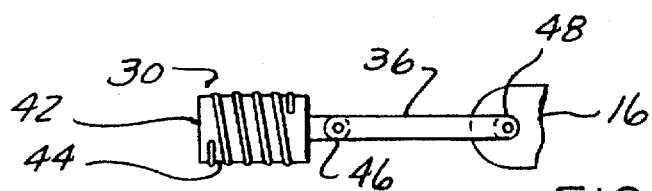
FIG. 2 is an alternative configuration of means for superimposing an oscillating motion over the relative velocity of movement along the weld path with various elements removed for clarity.
Figure 3:
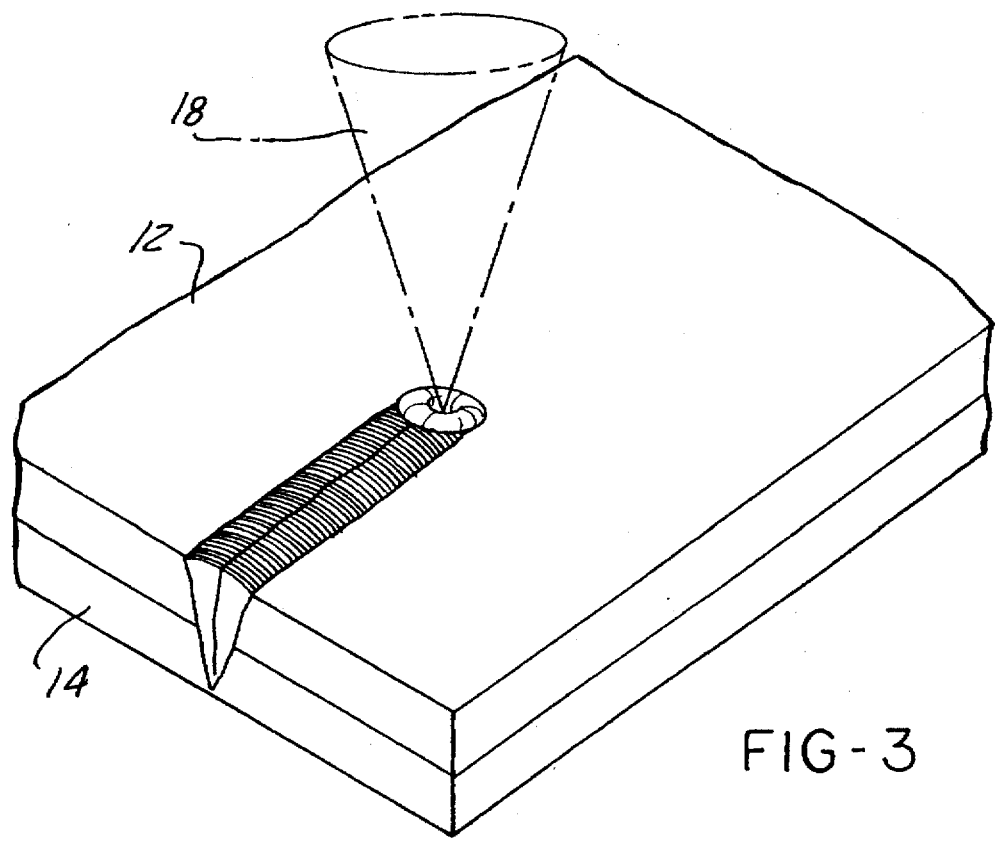
FIG. 3 is a perspective view of a traditional laser welded joint exhibiting hot cracking, micro-cracking and/or enbrittlement along the weld joint.

An apparatus 10 for laser welding a plurality of metal alloy workpieces, 12 and 14 respectively, to one another with a laser head 16 emitting a laser beam 18 is illustrated in FIGS. 1-3. The laser head 16 and workpieces, 12 and 14, move relative to one another at a predetermined velocity along a weld path. Means 20 is provided for superimposing an oscillating motion over the relative velocity of movement along the weld path, such that a rate of cooling of molten metal formed by the laser beam 18 along the weld path is controlled to a predetermined cooling rate. Preferably, the oscillating motion occurs in a direction coaxial with the weld path.

Figure 4A:
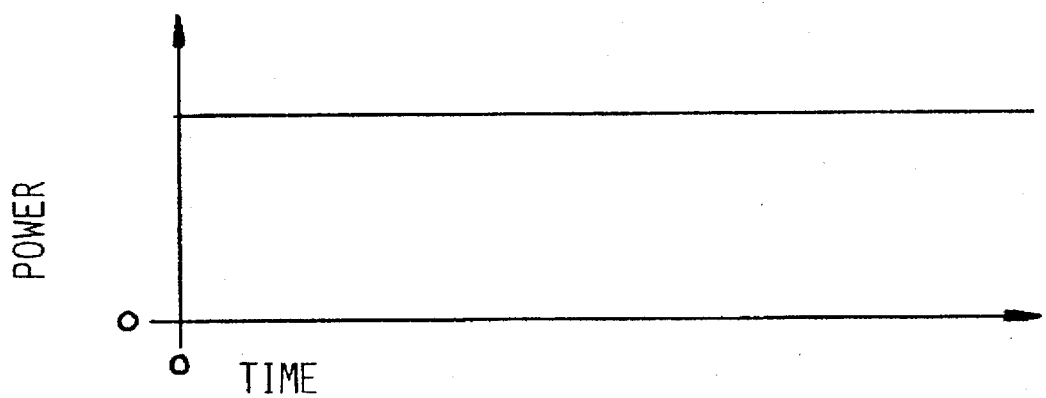
FIG. 4A is a graph depicting constant power output for a laser beam with respect to time.
Figure 4B:
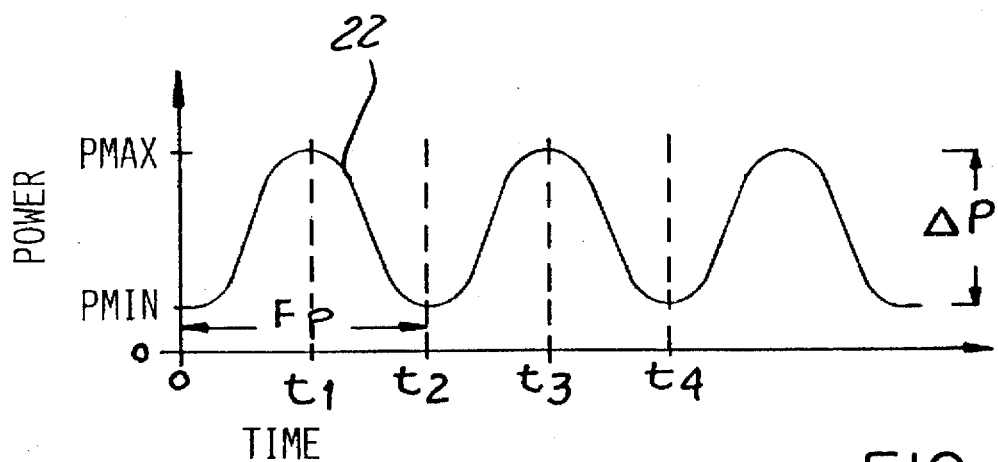
FIG. 4B is a graph depicting modulated sinusoidal power output of a laser beam with respect to time according to the present invention.
Figure 4C:
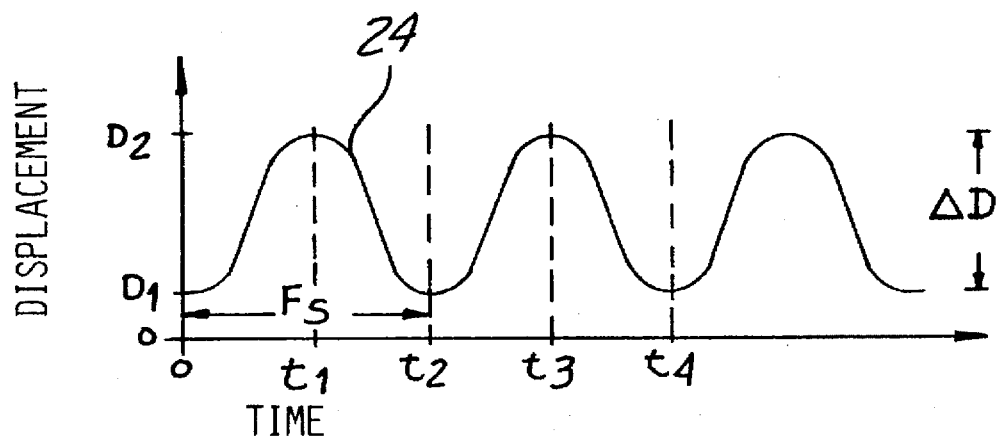
FIG. 4C is a graph illustrating one example of a synchronized oscillating motion with respect to the modulated output frequency of the laser beam illustrated in the graph of FIG. 4B.

Lasers are typically designed to have specific output characteristics, such as maximum output power, wavelength, peak power and the like. One of these characteristics typically includes the ability to modulate or vary the power intensity relative to time as illustrated by way of example in FIG. 4B. Constant power output relative to time is also possible for the laser as is illustrated in FIG. 4A. The frequency and maximum/minimum power values, sometimes referred to herein as amplitude, of the output curve are typically variable and selectable to desired values. The total area under the curve 22 corresponds to the total energy output of the laser beam 18. Preferably, the oscillating motion illustrated by curve 24 in FIG. 4C is synchronized with the frequency curve 22 of the modulated power output for the laser beam illustrated in FIG. 4B. When the frequency is matched at a ratio of 1:1, the peak of the power output curve 22 ($P_{max}$ of FIG. 4B at $t_1$) corresponds to a first end of a stroke in the oscillatory motion curve 24 ($D_2$ of FIG. 4C at $t_1$), while a valley in the power output curve 22 ($P_{min}$ of FIG. 4B at $t_1$) corresponds to a second end of the stroke for the oscillatory motion curve 24 ($D_1$ of FIG. 4C at $t_2$). The frequency synchronization can also be accomplished at one-half frequency, full frequency, or multiple pitch frequency. For example, if the power output frequency illustrated by curve 22 is $F_p$, the oscillatory motion curve 24 can be controllably synchronized to a selected value $F_s$ equal to $0.5F_p$, $1F_p$, $2F_p$, $3F_p$ or the like. The 1:1 ratio of power output frequency $F_p$ to oscillatory motion frequency $F_s$ is illustrated in FIGS. 4B and 4C respectively. Controlling the oscillating motion frequency to be one-half or double the power output frequency will yield different desired effects on the material. Adjusting the sweep or stroke distance ($\Delta D = D_2 - D_1$) of the oscillatory motion will also yield different desired effects on the material.

Returning to FIGS. 1-3, the laser head 16 is illustrated attached to a programmable means 26 for moving the laser head 16 along the weld path. The programmable means 26 may include a robot or robot arm. In the alternative, or in addition, the workpieces 12 and 14 can be moved relative to the laser head 16. In either case, it is preferred that a constant relative velocity is maintained with respect to the relative movement between the laser head 16 and the workpieces 12 and 14. The joint of the workpieces 12 and 14 shown in FIG. 3 is a lap joint, which is typical in automotive assemblies and structures. A butt joint, where opposing ends of two flat panels are welded together, as in tailored blanks or blankwelding, can also be accomplished by the apparatus 10 according to the present invention.

Means 28 for selectively modulating power output of the laser beam 18 is provided. The modulating means 28 can include controlling an amplitude and/or a frequency of power output of the laser beam 18. Preferably, the modulating means 28 provides a modulated sinusoidal power output curve 22 similar to that illustrated in FIG. 4B.

Means 30 is provided for controlling at least one characteristic of the oscillating motion selected from the group including stroke rate and/or distance, which may also be referred to occasionally as the frequency and amplitude of the oscillatory motion herein. Means 32 is provided for synchronizing a stroke rate or frequency of the oscillating motion with the frequency of the power output of the laser beam 18 at a desired ratio. The ratio of stroke rate $F_s$ to frequency $F_p$ may be selected by the laser operator to be any value desired. It is believed that the synchronized oscillating motion would typically have a stroke rate $F_s$ to output power frequency $F_p$ ratio in a range selected from the group of 1:7, 1:5, 1:3, 1:2, 1:1, 2:1, 3:1, 5:1, 7:1 and multiples thereof inclusive. Preferably, it is believed that the optimum $F_s$:$F_p$ ratio would most likely fall in a range selected from 1:2, 1:1 and 2:1 inclusive. Most preferably, the stroke rate $F_s$ to output power frequency $F_p$ ratio would be synchronized at 1:1, sometimes referred to herein as a matched frequency, since the peaks and valleys of the power output frequency $F_p$ correspond to the first and second end limits of travel for the oscillatory motion $F_s$ with respect to time as illustrated in FIGS. 4B and 4C. When the oscillating frequency $F_s$ as illustrated in curve 24 of FIG. 4C is matched to a modulated sinusoidal power output $F_p$ of the laser beam as illustrated in curve 22 of FIG. B, the laser beam sweeps forward relative to a direction of travel along the weld path while the power output $F_p$ is increasing, and the laser beam 18 sweeps backward relative to the direction of travel along the weld path while the power output $F_p$ is decreasing, provided that the relative velocity between the laser head 16 and the workpieces 12 and 14 is constant and less than the sweep speed $F_s$ of the laser beam 18. If the sweep speed $F_s$ of the focused laser beam 18 is the same as that of the overall relative velocity of the laser head 16, a stall condition will occur. If the sweep speed $F_s$ of the focused laser beam 18 is faster than the overall relative velocity of the laser head 16, a backward motion will occur. If the sweep speed $F_s$ of the focused laser beam 18 is slower than the overall relative velocity of the laser head 16, a slowdown in the relative rate of travel of the laser beam 18 will occur. Adjusting the oscillatory motion length ($\Delta D$) or amplitude, sometimes referred to herein as sweep distance, will also derive a similar effect. In any case, it is desirable in the present invention to cause a pause, or a reduction in the overall weld speed, while lowering the laser power level to reduce the temperature gradient at the weld zone. It is believed that this regulated cooling of the weld zone will eliminate or reduce the hot cracking, and the formation of elements in their elemental form as commonly occurs during traditional welding of certain alloys.

Referring now to FIG. 1, the means 30 for controlling at least one characteristic of the oscillating motion can include a servo-motor 34 attached to a linkage 36 which in turn is attached to the focus laser head 16. As the servo-motor 34 rotates, the linkage 36 drives the laser head 16 pivotally about pivot pin or point 38. The sweep distance ($\Delta D$) is variable and dependent on the eccentric distance from the center of servo-motor 34. Moving the connector 40 radially inward or outward with respect to the center of the servo-motor 34 causes corresponding changes in the sweep distance ($\Delta D$) or amplitude. The stroke rate or the frequency $F_s$ of the oscillatory motion is determined by the rate of rotation of the servo-motor 34. Each completed rotation of the servo-motor 34 corresponds to a complete forward and return stroke or cycle of the oscillatory motion. The assembly may be connected to the focusing element, rather than the entire focusing laser head 16, to keep the inertia of the total moving parts low. The servo-motor 34 can be electrically coupled and synchronized to the means 28 for selectively modulating power output of the laser beam 18, such as the laser power supply. The synchronization can be accomplished manually, or automatically, so that if the overall relative velocity between the laser head and the workpieces to be joined is increased or decreased, the stroke distance ($\Delta D$) or laser output frequency $F_p$ can be changed proportionately.

An alternative configuration is illustrated in FIG. 2, where the controlling means 30 includes a linear actuator means 42 for reciprocally driving between first and second end limits of travel, such as a solenoid 44. A linkage 36 is connected to the actuator means 42 at one end 46 while an opposite end 48 is connected to the focusing element, or focusing laser head 16. When the linear actuator means 42 moves from the first end limit of travel to the second end limit of travel, the laser head 16, or focusing element, is driven through linkage 36 to pivot the laser head 16 or focusing element about pivot pin or point 38 (illustrated in FIG. 1). The sweep distance ($\Delta D$) or amplitude is variable and dependent on the stroke distance of the linear actuator means 42. The linear actuator means 42 can be electrically coupled and synchronized to the laser power supply. The synchronization can be accomplished in a manner so that the stroke distance ($\Delta D$) or laser output frequency $F_p$ changes proportionately to any changes in the overall relative velocity between the laser head 16 and the workpieces 12 and 14. The overall benefits to this technology are not limited to any specific alloy or industry, although it is believed that the present invention will have the greatest impact on the automotive and transportation industries where aluminum is used extensively.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for laser welding a plurality of metal alloy workpieces to one another with a laser head emitting a laser beam, the laser head and workpieces moving relative to one another at a predetermined velocity along a weld path, the apparatus comprising:

means for modulating power output of said laser beam to a selected modulated sinusoidal power output; and means for superimposing an oscillating motion to said laser beam in a direction coaxial with said weld path over said relative velocity of movement along said weld path such that a rate of cooling of molten metal formed by said laser beam along said weld path is controlled to a predetermined rate, said oscillating motion of said laser beam having a frequency matched to said modulated sinusoidal power output of said laser beam.

2. The apparatus of claim 1 further comprising:

means for controlling at least one characteristic of said oscillating motion selected from the group including stroke rate and distance.

3. The apparatus of claim 1 further comprising:

said modulating means for controlling an amplitude and a frequency of power output of said laser beam; and means for synchronizing a stroke rate of said oscillating motion with said frequency of said modulating means.

4. The apparatus of claim 3 further comprising:

said synchronized oscillating motion having a stroke rate to output power frequency ratio in a range selected from the group of 1:7, 1:5, 1:3, 1:2, 1:1,2:1, 3:1, 5:1, 7:1 and multiples thereof inclusive.

5. The apparatus of claim 1 further comprising:

said laser beam sweeping forward relative to a direction of travel along said weld path while said power output is increasing, and said laser beam sweeping backward relative to said direction of travel along said weld path while said power output is decreasing.

6. The apparatus of claim 5 further comprising:

said laser head moving along said weld path at a constant velocity while said laser beam is oscillated thereby causing the laser beam to at least slow down relative to travel along the weld path during backward oscillatory movement of the laser beam.

7. The apparatus of claim 6 further comprising:

said laser beam at least stalling relative to travel along the weld path during backward oscillating movement of the laser beam.

8. The apparats of claim 7 further comprising:

said laser beam reversing direction relative to travel along the weld path during backward oscillatory movement of the laser beam.

9. The apparatus of claim 1 further comprising:

said modulating means for controlling an amplitude and a frequency of power output of said laser beam; and means for synchronizing a stroke rate of said oscillating motion with said frequency of said modulating means, said synchronized oscillating motion having a stroke rate to output power frequency ratio of 1:1.

10. An apparatus for laser welding a plurality of metal alloy workpieces to one another with a laser head emitting a laser beam, the laser head and workpieces moving relative to one another at a predetermined velocity along a weld path, the apparatus comprising:

means for modulating power of said laser beam to a selected modulated power output having a frequency;

means for superimposing an oscillating motion of said laser beam in a direction coaxial with said weld path over said relative velocity of movement of said laser head along said weld path such that a rate of cooling of molten metal formed by said laser beam along said weld path is controlled to a predetermined rate; and means for synchronizing a stroke rate of said oscillating motion with said frequency of said modulating means.

11. The apparatus of claim 10 further comprising:

said oscillating motion occurring in a direction coaxial with said weld path.

12. The apparatus of claim 10 further comprising:

means for controlling at least one characteristic of said oscillating motion selected from the group including stroke rate and distance.

13. The apparatus of claim 10 further comprising:

said modulating means for controlling an amplitude and a frequency of power output of said laser beam; and means for synchronizing a stroke rate of said oscillating motion with said frequency of said modulating means.

14. The apparatus of claim 10 further comprising:

said oscillating frequency matched to a modulated sinusoidal power output of said laser beam.

15. The apparatus of claim 10 further comprising:

said modulating means for controlling an amplitude and a frequency of power output of said laser beam; and said synchronized oscillating motion having a stroke rate to output power frequency ratio of 1:1.

16. A method for laser welding a plurality of metal alloy workpieces to one another with a laser head emitting a laser beam, the laser head and workpieces moving relative to one another at a predetermined velocity along a weld path, the method comprising the step of:

modulating power of said laser beam to a selected modulated power output having a frequency;

superimposing an oscillating motion of said laser beam in a direction coaxial with said weld path over said relative velocity of movement along said weld path such that a rate of cooling of molten metal formed by said laser beam along said weld path is controlled to a predetermined rate; and synchronizing a stroke rate of said oscillating motion with said frequency of said modulating means.

17. The method of claim 16 further comprising the steps of:

modulating power of said laser beam to a selected modulated power output having a frequency; and synchronizing a stroke rate of said oscillating motion with said frequency of said modulating means.

18. The method of claim 16 further comprising the steps of:

moving said laser head along said weld path at a constant velocity;

while moving said laser head, oscillating said laser beam to cause the laser beam to at least slow down relative to movement between the laser head with respect to the workpieces along the weld path during backward oscillatory movement of the laser beam.

19. The method of claim 16 further comprising the steps of:

controlling an amplitude and a frequency of power output of said laser beam during said modulating step; and during said synchronizing step, synchronizing said oscillating motion with a stroke rate to output power frequency ratio of 1:1.

* * * * *